(12) United States Patent
Marus et al.

(10) Patent No.: US 9,013,143 B2
(45) Date of Patent: Apr. 21, 2015

(54) METHOD FOR CHARGING A PLUG-IN ELECTRIC VEHICLE

(75) Inventors: James D. Marus, Royal Oak, MI (US); Vernon L. Newhouse, Farmington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 351 days.

(21) Appl. No.: 13/416,319

(22) Filed: Mar. 9, 2012

(65) Prior Publication Data

US 2013/0234664 A1 Sep. 12, 2013

(51) Int. Cl.
*H01M 10/46* (2006.01)
*B60L 11/18* (2006.01)

(52) U.S. Cl.
CPC .................. *B60L 11/1809* (2013.01)

(58) Field of Classification Search
CPC ......... Y02T 90/14; B60L 11/00; B60L 11/18; B60L 11/1809; H02J 7/0027; H02J 7/0021; H02J 7/0047
USPC .......... 320/109, 104, 132, 150; 324/426, 427, 324/430, 433; 701/1, 22; 702/57, 61, 63, 702/64, 65
See application file for complete search history.

(56) References Cited

U.S. PATENT DOCUMENTS

| | | | |
|---|---|---|---|
| 8,040,108 B2 * | 10/2011 | Tomura et al. | 320/132 |
| 8,519,674 B2 * | 8/2013 | Anderson et al. | 320/132 |
| 8,536,826 B2 * | 9/2013 | Matsuoka et al. | 320/106 |
| 8,653,788 B2 | 2/2014 | Masuda | |
| 2007/0139008 A1 * | 6/2007 | Sterz et al. | 320/125 |
| 2010/0043935 A1 * | 2/2010 | Fukunaga et al. | 152/454 |
| 2010/0101755 A1 * | 4/2010 | Morini | 165/53 |
| 2011/0127958 A1 * | 6/2011 | Ishishita et al. | 320/109 |
| 2012/0101755 A1 * | 4/2012 | Hirasawa | 702/63 |
| 2012/0274268 A1 * | 11/2012 | Ishida | 320/107 |

FOREIGN PATENT DOCUMENTS

| | | | |
|---|---|---|---|
| CN | 101624017 A | | 1/2010 |
| JP | 2001218378 A | * | 8/2001 |
| WO | WO2010150359 A1 | | 12/2010 |

OTHER PUBLICATIONS

Society of Automotive Engineers (SAE), "SAE Electric Vehicle Conductive Charge Coupler", Oct. 1996, Publication No. J1772.
Society of Automotive Engineers (SAE), "(R) SAE Electric Vehicle Inductively Coupled Charging", (R) Nov. 1999, Publication No. J1773.
Chinese Office Action, dated Sep. 26, 2014, 9 pages.

* cited by examiner

*Primary Examiner* — Edward Tso
(74) *Attorney, Agent, or Firm* — Lionel D. Anderson; Reising Ethington P.C.

(57) ABSTRACT

An exemplary charging system and method for controlling a fast charging process involving an external power source (e.g., a high-voltage charging station providing 10 kW-300 kW of power) and a plug-in electric vehicle. In one embodiment, the charging method uses a costing function to estimate the negative impact each fast charging session has on battery life. If the overall negative impact of past and/or present charging sessions has exceeded some threshold, then the charging method may reduce charging parameters (e.g., limit the charging amperage, voltage, power, duration, etc.) in an effort to avoid further diminishing the battery life. Thus, the charging system and method enable a user to frequently engage in fast charging sessions with an external power source, yet minimize the impact that such sessions have on the battery.

19 Claims, 4 Drawing Sheets

METHOD FOR CHARGING A PLUG-IN ELECTRIC VEHICLE

FIELD

The present invention generally relates to a plug-in electric vehicle and, more particularly, to a method for charging a plug-in electric vehicle with an external power source.

BACKGROUND

Plug-in electric vehicles may be charged with a variety of different power sources and charging arrangements. For example, it is possible to charge some plug-in electric vehicles with an extension cord connected to a standard electrical outlet, such as a 110V or 220V outlet (so-called "mode 1" charging). Other vehicles may be charged using a specific charge coupling with internal protection features that connects to a standard electrical outlet, like a 110V or 220V outlet ("mode 2" charging). Some vehicles use a specific charge coupling that plugs into a certain type of electrical outlet, such as one that allows for various charging control features, and is connected to a dedicated electrical circuit ("mode 3" charging). And yet other vehicles may be charged via a specialized charge coupling that connects to an external high-voltage charger, such as one that is part of a charging station or kiosk and provides 200V-600V of DC power ("mode 4" charging). A variety of different charge couplings, outlets, arrangements, methods, etc. exist for charging plug-in electric vehicles, each with its own advantages and disadvantages.

One advantage of charging a plug-in electric vehicle with an external high-voltage charger (mode 4 charging) is the rapid rate of charging. This type of charging arrangement, which is also called "fast charging," can significantly reduce charging times as it may provide between 10 kW-300 kW of charging power. However, if used frequently and without any constraints, fast charging from an external high-voltage power source can take a toll on the plug-in electric vehicle's battery and can reduce its useful battery life. The term "fast charging," as used herein, includes any charging event or arrangement where an external power source charges a plug-in electric vehicle with a charge rate that exceeds the C-Rate of the vehicle's battery (i.e., the theoretical amount of current the battery can deliver when discharged in one hour to the point of 100% depth of discharge). For example, if the vehicle battery has a C-Rate of 45 Amp-hours, then any charging event exceeding 45 Amps could be considered a "fast charging" event.

SUMMARY

According to one embodiment, there is provided a method for charging a plug-in electric vehicle with an external power source. The method may comprise the steps: (a) gathering data related to one or more past or present charging sessions, and using the charging data to estimate a negative impact on a battery of the plug-in electric vehicle; (b) comparing the negative impact on the battery of the plug-in electric vehicle to a negative impact threshold; and (c) when the negative impact on the battery of the plug-in electric vehicle exceeds the negative impact threshold, then limiting the charging power that is provided by the external power source to the plug-in electric vehicle.

According to another embodiment, there is provided a charging system for charging a plug-in electric vehicle with an external power source. The charging system may comprise: a power connection for connecting the plug-in electric vehicle to the external power source; isolation hardware coupled to the power connection, where the isolation hardware isolates electrical power provided by the external power source; a battery coupled to the isolation hardware, the battery provides the plug-in electric vehicle with electrical power for vehicle propulsion; one or more sensor(s) that provide data related to a charging session; and a control module coupled to the sensor(s). The control module may be configured to use the charging data to estimate a negative impact on the battery from charging with the external power source, and to limit the charging power provided by the external power source to the plug-in electric vehicle when the negative impact on the battery exceeds some negative impact threshold.

DRAWINGS

Preferred exemplary embodiments will hereinafter be described in conjunction with the appended drawings, wherein like designations denote like elements, and wherein.

DESCRIPTION

The exemplary charging system and method described herein may be used to control a fast charging process involving an external power source (e.g., a high-voltage charging station providing 10 kW-300 kW of power) and a plug-in electric vehicle, and may do so in a way that minimizes the impact to the vehicle's battery. According to an exemplary embodiment, the charging method uses a costing function to estimate the negative impact each fast charging session has on battery life (e.g., by using a quantitative impact number), and then adds up the negative impact for a number of past and/or present fast charging sessions. If the overall negative impact of the fast charging operations exceeds some threshold, then the charging method may reduce, constrain and/or otherwise control one or more charging parameters (e.g., reduce the charging amperage, voltage, power, duration, etc.) in an effort to avoid further diminishing the battery life. In this way, the exemplary charging system and method enable a user to frequently engage in fast charging sessions with an external high-voltage power source—a practice that if performed often and without constraint could negatively affect battery life—yet minimize the impact that such sessions have on the battery.

Figure 1:
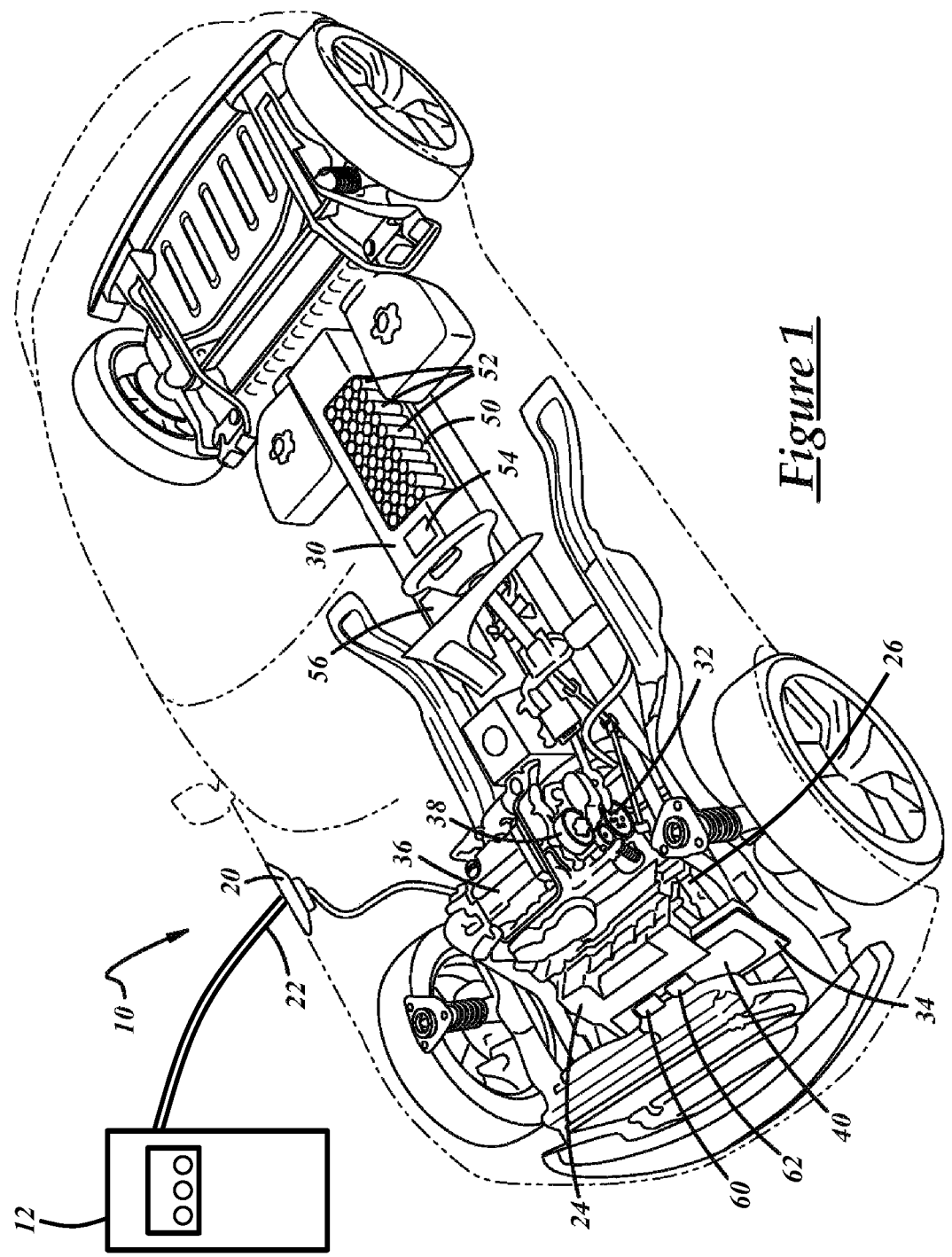
FIG. 1 is a schematic view of an exemplary plug-in electric vehicle that may utilize the charging system and method disclosed herein.

With reference to FIG. 1, there are shown some of the components of an exemplary plug-in electric vehicle 10 that may be used with the charging method described herein. Although the following description is provided in the context of a particular plug-in electric vehicle, it should be appreciated that this vehicle is merely exemplary and that other vehicles may certainly be used instead. For example, the charging system and method described below can be used with any type of plug-in electric vehicle that obtains electrical power from some off-board or external power source, including a plug-in hybrid electric vehicle (PHEV), a battery electrical vehicle (BEV), a plug-in electric vehicle that uses conducive charging with cords or cables, or a plug-in electric vehicle that uses inductive charging without cords or cables, to cite a few possibilities. According to an exemplary embodiment, plug-in electric vehicle 10 interacts with an external power source 12 and includes a power connection 20, a battery charger 24, isolation hardware 26, a battery 30, an electric motor 32, an inverter/converter 34, an engine 36, a generator 38, and a control module 40.

External power source 12 provides the plug-in electric vehicle with high levels of electrical power and may be one of a number of different power supply types known in the art. According to an exemplary embodiment, external power source 12 is an off-board, high-voltage power source that is part of a dedicated charging station or kiosk and provides plug-in electric vehicle 10 with high-voltage DC power (e.g., 200V-600V) for fast charging. External power source 12 may be designed to provide a relatively constant power level to plug-in electric vehicle 10 so that as voltage increases, the amperage correspondingly decreases. In another embodiment, external power source 12 is an off-board high-amperage power source that provides the plug-in electric vehicle with high-amperage DC or AC power (e.g., 50 A-500 A). External power source 12 may be coupled to a public electric utility or it may be powered by renewable energy from solar panels, wind turbines, hydroelectric means, biomass, etc.; it may provide AC or DC power; it may be high-voltage, high-amperage or both; or it may engage in conductive charging over cables or inductive coupling through the air, to cite several possibilities. External power source 12 is not limited to any particular type or embodiment, so long as it can provide high power levels (e.g., 10 kW-300 kW) to plug-in electric vehicle 10.

Power connection 20 is an electrical inlet or socket on the plug-in electric vehicle into which the power coupler is inserted or connected. This enables a vehicle owner to easily connect and disconnect plug-in electric vehicle 10 to and from a charging point, like external power source 12. Power connection 20 is not limited to any particular design or configuration, and may be any type of inlet, connection, socket, plug, port, receptacle, etc., including those that are based on conductive, inductive and/or other types of electrical connections. Some of these connection types conform to international standards (e.g., IEC 62196, SAE J1772, CHAdeMO, etc.). In an exemplary embodiment, power connection 20 is a high-voltage electrical inlet located on the exterior of plug-in electric vehicle 10 so that it can be easily accessed (e.g., under a hinged door or flap), and includes connections for conveying electrical power to the vehicle, as well as communication or control signals. Other arrangements and embodiments are certainly possible.

Power coupler 22 connects the external power source to the power connection, and can be of any suitable type or configuration. Power coupler 22—sometimes referred to as an electric vehicle supply equipment (EVSE) cordset—may be a specialized cordset that is specifically designed for use with plug-in electric vehicles (such as those described in specifications SAE J-1772 and J-1773), and includes a first end, a cable or cord, a control unit, and a second end. The first end of power coupler 22 plugs into external power source 12 and the second end is a specifically designed connection that plugs into power connection 20 on the plug-in electric vehicle. The cable provides electrical power from external power source 12 to plug-in electric vehicle 10, but may also convey one or more communication signals between a control unit of power coupler 22 and devices located on the vehicle, like control module 40. The control unit in power coupler 22 may include any number of electronic components including, but certainly not limited to, sensors, transceivers, processing devices, memory devices, contactors, switches, ground fault circuit interrupter (GFCI) components, as well as any other suitable component. In an exemplary embodiment, the control unit in power coupler 22 monitors various conditions surrounding the power coupler (e.g., the presence of electrical power, voltage, current and/or power levels, the temperature of the power coupler, etc.), and communicates with control module 40 regarding such conditions. Skilled artisans should appreciate that the method described herein is not limited to any particular power coupler or cordset, as any number of different power couplers could be used.

Battery charger 24 receives electrical power from a variety of sources, including external and/or internal power sources, and uses this power to charge the battery. In the case of an external power supply, battery charger 24 may receive electrical power from external power source 12 through power coupler 22 and connection 20, as already explained. In the case of an internal power supply, battery charger 24 may receive electrical power from regenerative braking, a motor-driven generator 38, or some other internal source via electrical connections within the vehicle. Skilled artisans will appreciate that battery charger 24 may be provided according to any number of different embodiments, may be connected in any number of different configurations, and may include any number of different components, such as transformers, rectifiers, switching power supplies, filtering means, cooling means, sensors, control units and/or any other suitable components known in the art.

Isolation hardware 26 is connected to the power connection and may isolate, control and/or otherwise route electrical power from the external power source to different devices within the plug-in electric vehicle. For example, isolation hardware 26 may be coupled to power connection 20 and designed to receive high-voltage power from external power source 12 and directly deliver the high-voltage power to battery 30, without going through the normal charging path or channels. By-passing certain components, such as battery charger 24, for example, may be desirable if those components are not equipped to handle such high voltage, amperage and/or power levels. Moreover, isolation hardware 26 may have contactors and/or other electrical components that isolate and protect both users and other vehicle devices from the high power levels provided by external power source 12. The plug-in electric vehicle may also include lower voltage hardware for when the vehicle is being charged by a traditional power source with lower voltage and power sources. In some exemplary embodiments, isolation hardware 26 has relays, contactors, transistors (e.g., field-effect transistor (FET), etc.), or some combination thereof.

Battery 30 provides the plug-in electric vehicle with electrical power and, depending on the particular embodiment, may be the primary electrical power source for the vehicle or may be used in conjunction with another power source for power supplementation purposes, to cite two examples. Many different battery types and arrangements may be used, including the exemplary one schematically shown here which includes a battery pack 50, battery cells 52, one or more battery sensors 54, and a battery control unit 56. Battery pack 50 is a high-voltage battery pack and may include a collection of identical or individual battery cells 52 connected in series, parallel, or a combination of both in order to deliver a desired voltage, amperage, capacity, power density and/or other performance characteristics. Generally, it is desirable to provide high power and energy densities, which has led to the development and use of many types of batteries including chemical, non-chemical, and others. Some examples of suitable battery types include those that are based on the following technologies: lithium ion, nickel metal hydride (NiMH), nickel cadmium (NiCd), sodium nickel chloride (NaNiCl), or some other battery technology. According to an exemplary embodiment, battery pack 50 is based on lithium-ion technology and provides approximately 40V-600V, depending on its particular design and application. For example, a heavy truck using a two-mode hybrid system may require a battery pack capable of providing high voltage levels, where a lighter vehicle may need lower voltage levels. In another embodiment, battery 30 is part of a belt-alternator-starter (BAS) or BAS-plus type system and thus only requires a battery pack providing lower voltage levels. In any case, battery pack 50 should be designed to withstand repeated charge and discharge cycles and to receive electrical energy from external power source 12. Skilled artisans will appreciate that the system and method shown and described herein are not limited to any one particular type of battery, chemistry and/or arrangement, as a number of different battery types could be employed.

Battery sensors 54 may include any combination of hardware and/or software components capable of monitoring battery conditions such as battery temperature, battery voltage, battery current, battery state-of-charge (SOC), battery state-of-health (SOH), C-rate, etc. These sensors may be integrated within unit 30 (e.g., an intelligent or smart battery), they may be external sensors located outside of the battery unit, or they may be provided according to some other known arrangement. Battery sensors 54 may monitor and determine battery conditions on a cell-by-cell basis, on an average or collective basis across a block or region of cells, on an entire battery pack basis, on a representative basis where certain cells are selected to represent the entire battery pack, or according to some other basis or technique known in the art. Output from battery sensors 54 may be provided to battery control unit 56, battery charger 24, control module 40, or some other appropriate device.

Battery control unit 56 may include any variety of electronic processing devices, memory devices, input/output (I/O) devices, and other known components, and may perform various control and/or communication related functions. For example, battery control unit 56 may receive sensor signals from the various battery sensors 54, package the sensor signals into an appropriate sensor message, and send the sensor message to control module 40 over a communication bus or the like. It is possible for battery control unit 56 to gather battery sensor readings and store them in local memory so that a comprehensive sensor message can be provided to control module 40 at a later time, or the sensor readings can be forwarded to module 40 or some other destination as soon as they arrive at the battery control unit, to cite a few possibilities. Instead of sending the battery sensor readings to control module 40 for subsequent processing, it is possible for battery control unit 56 to process or analyze the sensor readings itself. In another capacity, battery control unit 56 can store pertinent battery characteristics and background information pertaining to the battery's cell chemistry, cell capacity, upper and lower battery voltage limits, battery current limits, battery temperature limits, temperature profiles, battery impedance, number or history of charge/discharge events, etc. In one example, battery control unit 56 stores and maintains values pertaining to the negative impact of previous fast charging sessions (individually or collectively) and makes those values available to the present charging method.

Control module 40 may be used to control, govern or otherwise manage certain operations or functions of plug-in electric vehicle 10 and, according to one exemplary embodiment, includes a processing device 60 and a memory device 62. Processing device 60 may include any type of suitable electronic processor (e.g., a microprocessor, a microcontroller, an application specific integrated circuit (ASIC), etc.) that executes instructions for software, firmware, programs, algorithms, scripts, etc. This processor is not limited to any one type of component or device. Memory device 62 may include any type of suitable electronic memory means and may store a variety of data and information. This includes, for example: values for the negative impact of previous fast charging sessions (individually or collectively); sensed battery conditions; look-up tables and other data structures; software, firmware, programs, algorithms, scripts, and other electronic instructions; component characteristics and background information, etc. The present method—as well as any other electronic instructions and/or information needed for such tasks—may also be stored or otherwise maintained in memory device 62. Control module 40 may be electronically connected to other vehicle devices and modules via I/O devices and suitable connections, like a communications bus, so that they can interact as required. These are, of course, only some of the possible arrangements, functions and capabilities of control module 40, as others are certainly possible. Depending on the particular embodiment, control module 40 may be a stand-alone electronic module (e.g., a battery charging control module, a vehicle integration control module (VICM), a traction power inverter module (TPIM), a battery power inverter module (BPIM), etc.), it may be incorporated or included within another electronic module in the vehicle (e.g., a power train control module, an engine control module, a hybrid control module, etc.), or it may be part of a larger network or system (e.g., a battery management system (BMS), a vehicle energy management system, etc.), to name a few possibilities. Control module 40 is not limited to any particular type, kind or configuration.

Plug-in electric vehicle 10 may also include any number of other known components, devices, systems, etc., including: one or more electric motors 32 that drive the vehicle wheels; an inverter/converter 34 that acts as an intermediary between the battery and the electric motor(s); an engine 36 that drives a generator and/or the vehicle wheels using conventional internal combustion techniques; and/or a generator 38 that is coupled to the engine, the vehicle wheels or some other source of rotary motion and generates electrical power that can then be used for propulsion, saved at the battery or both. It should be appreciated that the preceding list is not an exhaustive or exclusive list of all of the potential parts that could be included within plug-in electric vehicle 10, as they are only provided as examples of some of the possibilities. Some of the preceding devices may be combined or otherwise integrated with one another, such as electric motor 32 and generator 38 which can be combined into a so-called "mogen."

Again, the preceding description of exemplary plug-in electric vehicle 10 and the drawing in FIG. 1 are only intended to illustrate one potential vehicle arrangement and to do so in a general way. Any number of other vehicle arrangements and architectures, including those that differ significantly from the one shown in FIG. 1, may be used instead.

Figure 2:
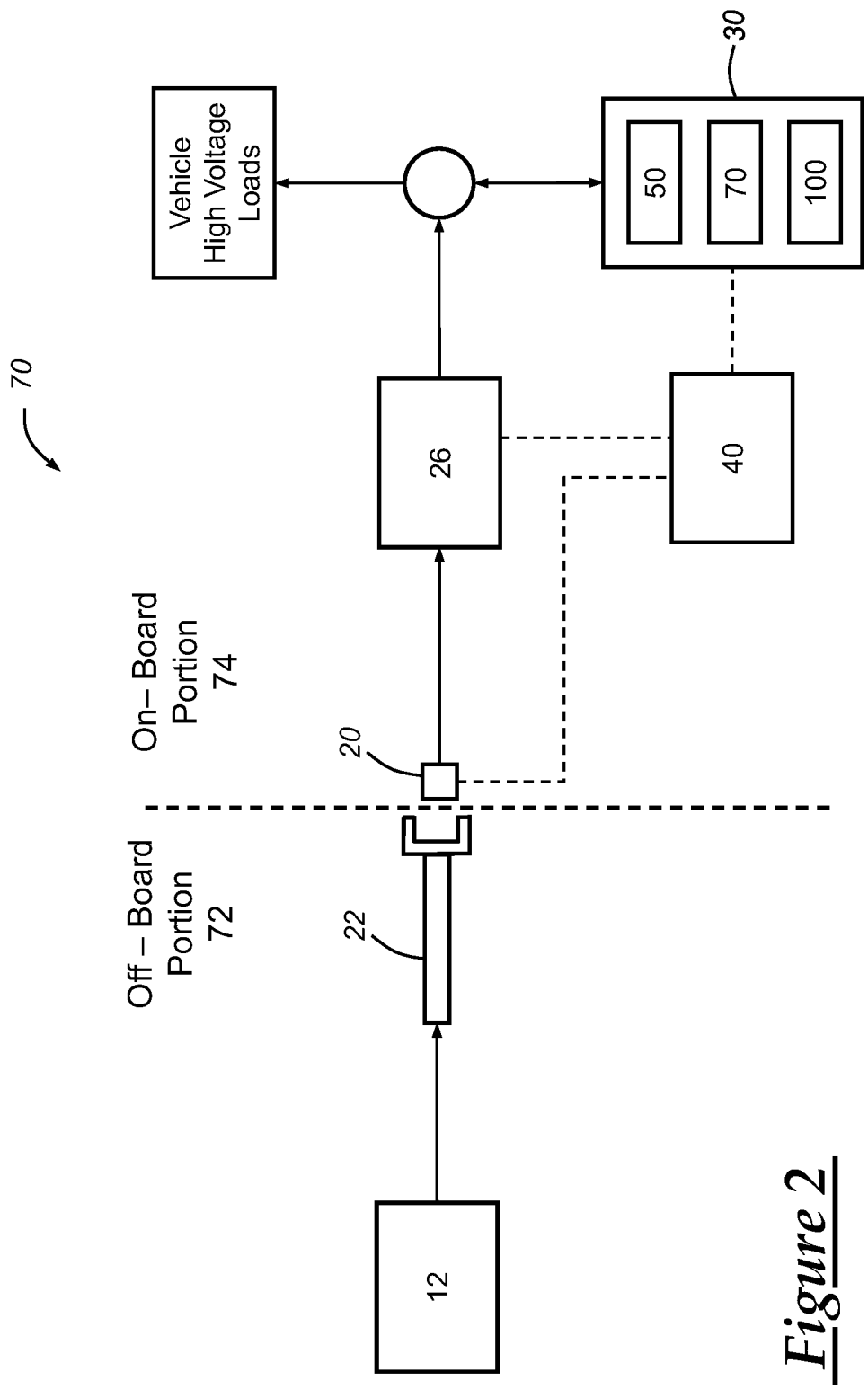
FIG. 2 is a schematic block-diagram of a charging system that may be used with a plug-in electric vehicle, such as the one illustrated in FIG. 1.

Turning now to FIG. 2, there is shown a schematic block diagram of an exemplary high-voltage charging system 70 that may be used to fast charge a plug-in electric vehicle, such as vehicle 10. High-voltage charging system 70 includes an off-board portion 72 that is generally external to the vehicle, and on-board portion 74 that is generally internal to the vehicle. The off-board portion 72 of the charging system includes external power source 12 and power coupler 22, while the on-board portion 74 includes power connection 20, isolation hardware 26, battery 30, and control module 40. Skilled artisans will appreciate that the on-board portion 72 of the charging system may include and utilize an existing high-voltage DC path to provide power to battery 30 (i.e., the vehicle energy storage system) where the high-voltage DC path is already used by the vehicle for propulsion, or it may include a dedicated high-voltage DC path to charge the battery. In one potential embodiment, high-voltage charging system 70 recognizes when the plug-in electric vehicle is connected to an external high-voltage power source 12 via power coupler 22 and takes appropriate steps to make sure that the high-voltage power is properly isolated and connected to battery 30. This detection may be performed by the control unit within power coupler 22, battery charger 24, isolation hardware 26, battery 30, control module 40, or some combination thereof, and may use any suitable techniques known in the art. Control module 40 may be connected to any combination of devices within the on-board and/or off-board portions of high-voltage charging system 70, as illustrated by the broken lines.

Figure 3:
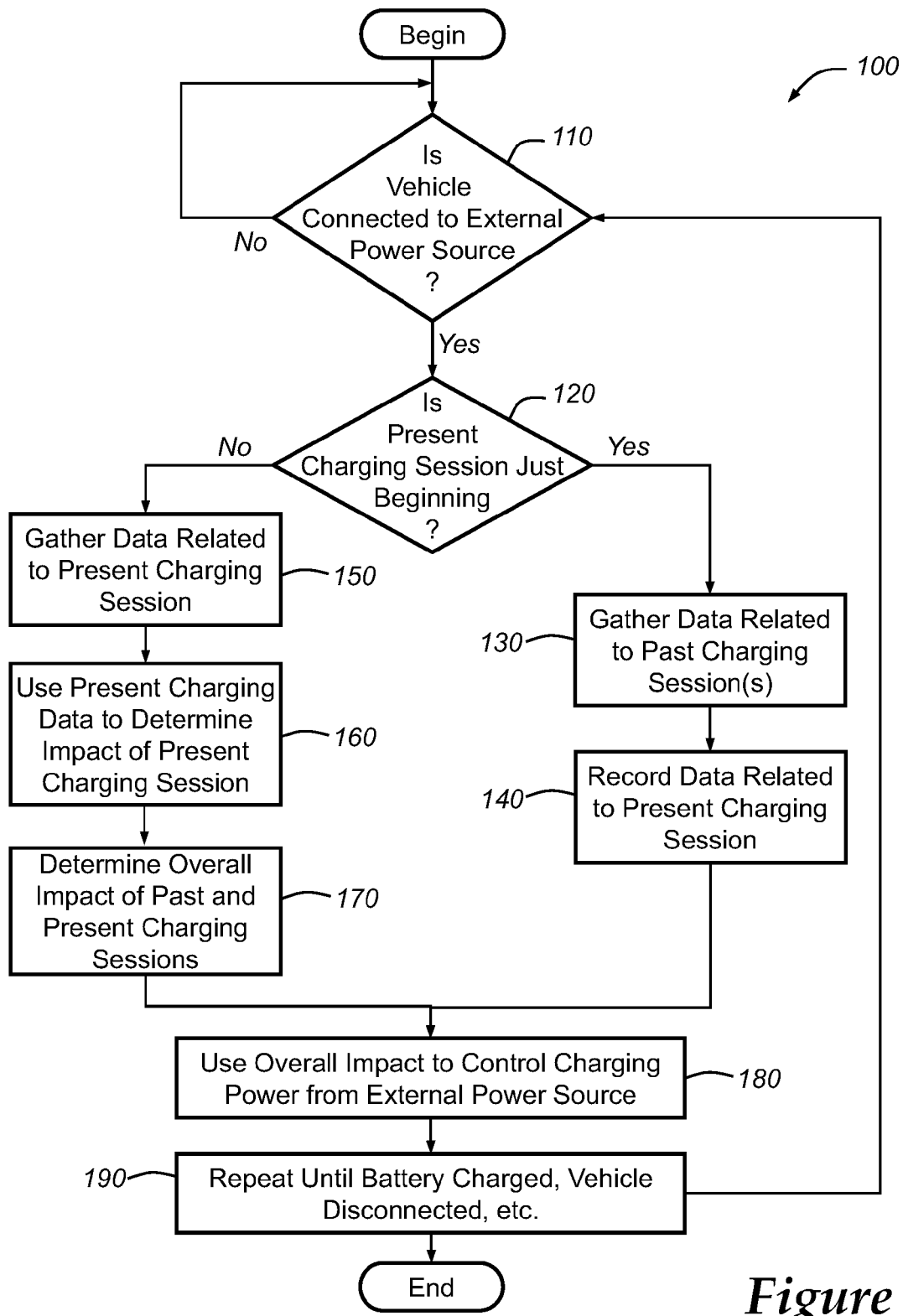
FIG. 3 is a flowchart of an exemplary method that may be used to control a fast charging process for a plug-in electric vehicle, such as the one shown in FIG. 1.

Turning now to FIG. 3, there is shown an exemplary method 100 that may be used to control a fast charging process involving an external high-voltage power source and a plug-in electric vehicle, where the method is designed to minimize the negative impact that repeated use of a fast charging process can have on long term battery life and/or performance. The method starts at step 110 and determines if the plug-in electric vehicle is connected to an external power source. In one embodiment, power coupler 22 is equipped with circuitry that can detect a connection to an external power source and can recognize when the source is a high-voltage power source 12, such as the type found in a charging station or kiosk. As mentioned above, some high-voltage power sources can deliver between 200V-600V of DC power at 50 A-500 A of current for a total power delivery of 10 kW-300 kW. That is not to say, of course, that the present method is limited to use with such a high-voltage power source, as the method may be used with power sources that are AC or that provide current outside of the above-listed amperage range. If a high-voltage external power source is detected and identified, power couple 22 or some other device sends a signal to control module 40 notifying it that a high-voltage connection has been made. If step 110 determines that plug-in electric vehicle 10 is successfully connected to an external power source, then the method proceeds to the next step; otherwise, the method loops back for continued monitoring.

Step 120 then determines whether or not the present charging session is just beginning. For example, if the present charging session is performing its first charge cycle or iteration, then it may be desirable for the method to engage in some sequence or combination of setup procedures (e.g., starting a new record, gathering previous records, etc.). If, on the other hand, the charging session has been ongoing for some time, then the above-mentioned setup procedures may be unnecessary. Generally speaking, the method is more interested in gathering data or information relating to past charging sessions during its initial cycle, and is more concerned with data or information regarding the present charging session during subsequent cycles. It is not necessary for step 120 to make a decision based on the first cycle alone; instead, step 120 could determine whether or not the present charging session is in an initial stage that involves multiple cycles (e.g., the first two, five, ten cycles, etc. of the charging session). If step 120 determines that the charging session is just beginning, then the method proceeds to step 130; if step 120 determines that the charging session has been going on for a while and is not in its initial stage, then the method proceeds to step 150. It should be appreciated that step 120 is an optional step and that it could be omitted or combined with other steps.

At step 130, the method gathers data related to past charging sessions, and may do so in a variety of ways. Past charging data can be used to estimate the negative impact that past charging sessions have had on the vehicle's battery 30 and, if the overall or collective negative impact exceeds some threshold, this data can be used to limit the impact of present or future charging sessions. The term "past charging data" broadly includes any information or data that relates to previous charging sessions and could be used to determine the negative impact that such sessions have had on the battery. In an exemplary embodiment, step 130 retrieves past charging data from memory located on the plug-in electric vehicle (e.g., from memory device 62 in control module 40), where the past charging data includes some combination of the following information: past charging parameters (e.g., temperatures, voltages, amperages, power levels, rates of charge, states of charge (SOC), C-rates, etc.), past charging history (e.g., the time, day, duration, etc.), past charging impact (e.g., a quantitative value like a past impact number, which is provided by a cost function or software model and represents the impact of previous charging sessions on the battery), or other past charging data. Past charging data may be quantitative (e.g., a numerical voltage level or impact number) or qualitative (e.g., low, medium, high); it may represent an average, peak or total value; or it may only relate to a single past charging session or to a number of past charging sessions, to cite just a few of the possibilities. Past charging data may include a wide variety of information and data and is certainly not limited to the examples provided above.

In a non-limiting example, step 130 gathers past charging data by retrieving one or more electronic records from memory located on the plug-in electric vehicle, where an electronic record includes a past impact number and a time stamp for one or more earlier charging sessions. The past impact number is a quantitative value that represents the estimated negative impact that previous charging sessions have had on the vehicle's battery, and it can be generated using costing functions, software models, or some other tool known to those skilled in the art. The past impact number can be representative of a single previous charging session or it can represent multiple charging sessions as a cumulative battery impact estimate. The time stamp provides the method with information relating to the time, day, duration, frequency, etc. of one or more earlier charging sessions. Skilled artisans will appreciate that if two previous charging sessions were performed within hours of one another, the overall impact on battery life may be greater than if the same two charging sessions were performed days apart. This and many other factors can impact the degree to which past charging sessions negatively impact the battery and are the types of information that may be captured in or represented by the past impact number and/or other pieces of information stored as past charging data. It is possible for time stamp information to be rolled into or integrated within the past impact number, so that the past impact number takes temporal issues into account.

At step 140, the method gathers and records data related to the present charging session; that is, present charging data. Generally speaking, the present charging data is largely the same as the past charging data, only the information pertains to the current charging session as opposed to one or more previous charging sessions. In an exemplary embodiment, step 130 creates a new electronic record for the present charging session and populates it with some combination of present charging parameters, present charging history and/or present charging impact information. Since the present charging session is just beginning, there may not be enough information yet to record present charging parameters or impact information. In that case, step 140 may simply record the time and date at which the current charging session began (present charging history) and then record the other present charging data at a later time. Other embodiments are also possible.

At this point, the method normally proceeds to step 180 so that the overall negative impact to the battery can be calculated and, if it exceeds some threshold, the present charging session can be constrained in a way that avoids further acceleration of battery life degradation. Because the sequence of steps 120, 130, 140 and 180 is executed at the beginning of the present charging session, step 180 would largely base the decision to constrain or limit current charging levels on past charging sessions. For the sequence that includes steps 120, 150, 160, 170 and 180, the present charging session is sufficiently far along in the sequence to have produced enough new data to make a decision whether or not to constrain current charging levels. Put differently, if the method proceeds through steps 120, 130 and 140, then the present charging session is just beginning and step 180 may decide to limit fast charging from external power source 12 based only on past charging data; if the method proceeds through steps 120, 150, 160 and 170, then the present charging session is well underway and step 180 may base its decision on both past and present charging data. Some of the techniques and methods that may be employed by step 180 to constrain or limit current charging levels are described below in step 180.

Returning to step 120, if the method determines that the present charging session is not just beginning (i.e., the plug-in electric vehicle has been charging for a while), then the method advances to step 150. This step gathers and/or records data that relates to the present charging session. As mentioned above, present charging data may include any combination of the following information: present charging parameters (e.g., temperatures, voltages, amperages, power levels, rates of charge, states of charge (SOC), C-rate, etc.), present charging history (e.g., the time, day, duration, etc.), present charging impact (e.g., a present impact number), or other present charging data. According to an exemplary embodiment, step 150 gathers one or more present charging parameters in the form of sensor readings from battery sensors 54 or some other suitable device, where the sensor readings include some combination of battery temperature, battery current, battery voltage, state-of-charge (SOC), C-rate, etc. These readings may be provided as slow- or fast-moving averages, for example.

Step 160 then uses the present charging data to determine the negative impact that the present charging session has had on the battery. In an exemplary embodiment, step 160 uses the present charging data from the previous step to estimate an instantaneous impact number, and then integrates the instantaneous impact numbers over the duration of the present charging session to arrive at a present impact number. The instantaneous impact number represents the estimated impact that the current charging session is having on the battery at that time, and it can be determined by using the present charging data (e.g., battery temperatures, voltages, amperages, power levels, rates of charge, states of charge (SOC), C-rate, etc.) in conjunction with a look-up table, calibration table, or any other data structure or algorithmic tool. In such an example, the present charging data could be the input for the look-up table, and the instantaneous impact number could be the output. Over time, a plot of instantaneous impact numbers as a function of time is generated, which can then be integrated to arrive at the present impact number. The present impact number represents the cumulative effect that the fast charging process has had on the battery during the present charging session.

Figure 4:
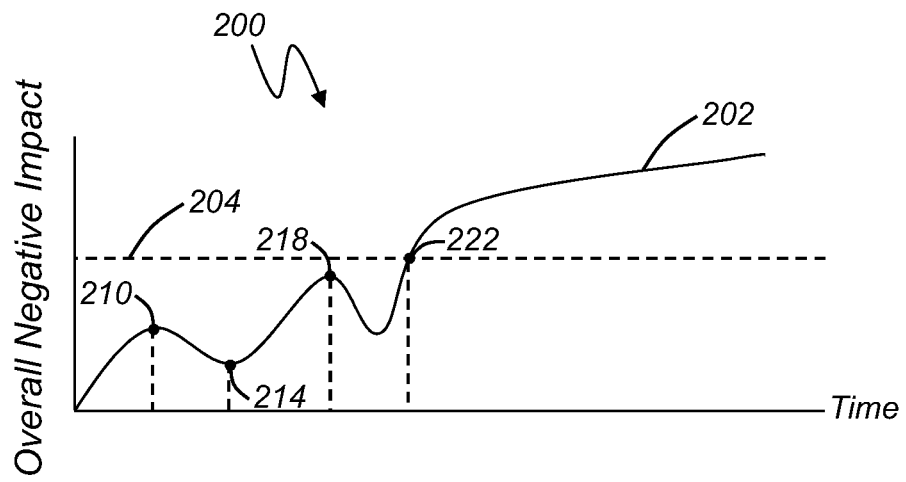
FIGS. 4-5 are plots showing different characteristics of a plug-in electric vehicle battery, and are provided to help illustrate some of the steps in the method shown in FIG. 3.

Next, step 170 adds the negative impact of past charging sessions to that of the present charging session to determine an overall negative impact. This may be performed in a variety of ways. For instance, a past impact number (e.g., the one retrieved during step 130) may be added to a present impact number (e.g., the one determined in step 160) to arrive at an overall impact number. The overall impact number is a quantitative value representative of the total negative impact on the battery due to high-power charging sessions (both past and present) that use external power source 12, as illustrated in graph 200 in FIG. 4. In graph 200, the curve 202 represents the overall impact number plotted over time, where sections of the curve that are increasing correspond to fast charging events and sections that are decreasing represent periods where the vehicle is not being fast charged. For example, a fast charging event may occur from time zero to point 210, a non-charging event may occur from point 210 to point 214, and another fast charging event may occur from point 214 to point 218.

Skilled artisans will appreciate that a present charging session may have a greater influence on the overall impact number than past charging sessions that occurred long ago. Different schemes and techniques for weighting the negative impact of past and present charging sessions may be employed by step 170. It is even possible for certain past charging sessions to be devalued or even factored out of the past impact number once a certain amount of time has passed; the past charging history information that is stored in memory, such as a time stamp, may be useful for this purpose. For example, step 170 may consider a list of past charging sessions compiled over a predetermined period of time (e.g., few days, a week, a month, a year, etc.) and then devalue or assign less weight to the contribution of each session based on how old it is (e.g., by using a factor, a weight function, percentage, etc.). It is also possible for step 170 to only consider a predetermined number of past charging sessions (e.g., the last 5, 10, or 20 sessions, or only those past charging sessions that occurred in the preceding 1 month, 3 months, 6 months, etc.). Once the overall negative impact of past and present charging sessions is estimated, the method proceeds to step 180.

In alternative embodiments, step 170 may determine the overall negative impact based only on past charging sessions or only on the present charging session, instead of using both. As already mentioned, fast charging a vehicle battery with a high-voltage external power source, like source 12 which can deliver 10 kW-300 kW of power, can negatively impact the performance and/or life of the battery if done in an unconstrained manner. Thus, the need for controlling the charging power from external power source 12.

Figure 5:
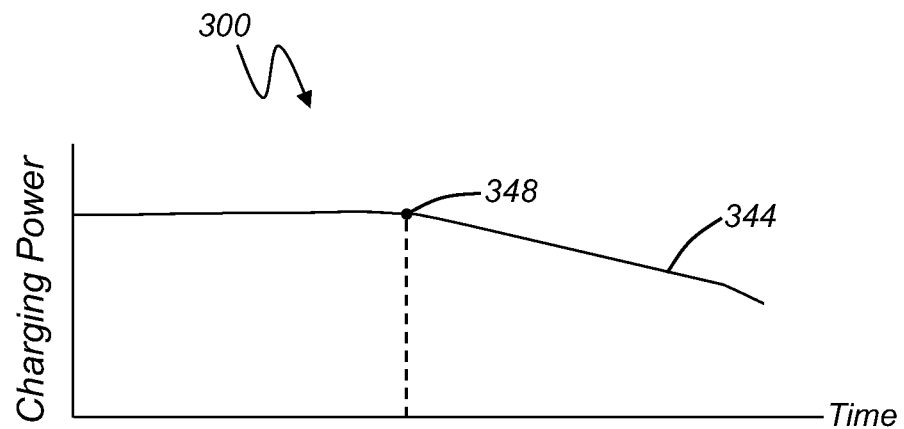

Step 180 then uses the overall negative impact on the vehicle battery to constrain, limit and/or otherwise control the charging power that is delivered from external power source 12 to plug-in electric vehicle 10. According to one example that is provided in connection with FIGS. 4 and 5, step 180 compares the overall impact number (plot 202) to a negative impact threshold 204 and decreases the charging power to the vehicle when the threshold is exceeded (point 222). Point 222 generally represents the point where the method determines that battery 30 will experience an unacceptable negative impact if fast charging continues at the current charging levels. Thus, step 180 may begin to decrease or otherwise curtail the power delivered by external power source 12 to plug-in electric vehicle 10, as shown at point 348 in FIG. 5. Point 348 corresponds in time to point 222. This decrease in charging power could involve a reduction in amperage, but could also involve decreasing the voltage, duty cycle, or some combination thereof. In one example, step 180 uses the overall impact number as an input to a look-up table (e.g., a linear look-up table that extrapolates in between data points) or other data structure, which in return outputs a power limit for charging the plug-in electric vehicle. Other techniques may be used as well.

To actually implement the decrease in charging power, control module 40 may send command signals to external power source 12, power coupler 22, isolation hardware 26 or some other device instructing them to reduce the charging power. In one example, control module 40 sends command signals over serial or PLC communications to instruct the power source as to the desired charging level. The exact nature of the interaction between control module 40 and charging system 70 may vary, depending on the particular external power source, power coupler, vehicle hardware, etc. These procedures may continue to repeat until plug-in electric vehicle is fully charged, the vehicle is disconnected from external power source 12, or the method decreases the charging power down to some minimal amount. Those skilled in the art will recognize that the constraining, limiting and/or controlling that occurs in step 180 is generally for purposes of battery charging and is not necessarily for limiting power that is provided to the vehicle for other purposes, like supporting other high-voltage loads. Such power provision may be supported in conjunction with battery charging.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for charging a plug-in electric vehicle with an external power source, comprising the steps of:
   a) gathering charging data related to one or more past charging sessions and a present charging session, and when the present charging session is not in an initial stage then using a control module and a costing function or a software model in conjunction with the charging data to estimate a negative impact that the past and present charging sessions have had on a battery of the plug-in electric vehicle;
   b) comparing the negative impact on the battery of the plug-in electric vehicle to a negative impact threshold; and
   c) when the negative impact on the battery of the plug-in electric vehicle exceeds the negative impact threshold, then limiting the charging power that is provided by the external power source to the plug-in electric vehicle.

2. The method of claim 1, wherein step (a) further comprises gathering past charging data from memory located on the plug-in electric vehicle, where the past charging data is related to one or more past charging sessions and includes at least one piece of data selected from the group consisting of: past charging parameters, past charging history, or past charging impact.

3. The method of claim 2, wherein step (a) further comprises gathering past charging data that includes a past impact number, and the past impact number is a quantitative value representative of the estimated negative impact of one or more past charging sessions on the battery.

4. The method of claim 1, wherein step (a) further comprises gathering present charging data, where the present charging data is related to a present charging session and includes at least one piece of data selected from the group consisting of: present charging parameters, present charging history, or present charging impact.

5. The method of claim 4, wherein step (a) further comprises using the present charging data to determine a negative impact of the present charging session on the battery of the plug-in electric vehicle.

6. The method of claim 5, wherein step (a) further comprises adding the negative impact of the present charging session to a negative impact of one or more past charging sessions to determine an overall impact on the battery of the plug-in electric vehicle.

7. The method of claim 1, wherein step (a) further comprises gathering a present charging parameter from a sensor located on the plug-in electric vehicle, where the present charging parameter includes at least one piece of data selected from the group consisting of: a temperature, a voltage, an amperage, a power level, a rate of charge, a state of charge (SOC), or a C-rate.

8. The method of claim 7, wherein step (a) further comprises using the present charging parameter to determine an instantaneous impact number that represents the impact that the present charging session is having on the battery at that time.

9. The method of claim 8, wherein a look-up table uses the present charging parameter as an input and provides the instantaneous impact number as an output.

10. The method of claim 8, wherein step (a) further comprises integrating the instantaneous impact number over the duration of the present charging session to determine a present impact number that represents the cumulative impact of the present charging session.

11. The method of claim 9, wherein step (a) further comprises adding the present impact number for the present charging session to a past impact number for one or more past charging sessions to determine an overall impact number that represents the total impact of both past and present charging sessions.

12. The method of claim 11, wherein the past impact number for one or more past charging sessions is devalued or reduced in weighting based on how long ago they occurred.

13. The method of claim 1, wherein step (b) further comprises comparing an overall impact number that represents the total impact of both past and present charging sessions to a negative impact threshold that represents the level where further fast charging is likely to have an unacceptable negative impact on the battery of the plug-in electric vehicle.

14. The method of claim 1, wherein when the negative impact on the battery exceeds the negative impact threshold, then step (c) further comprises limiting the charging power that is provided by the external power source to the plug-in electric vehicle by sending command signals from a control module located on the plug-in electric vehicle to the external power source that instructs the external power source to decrease the charging amperage.

15. The method of claim 14, wherein a look-up table uses an overall impact number as an input and provides a decreased charging power as an output.

16. The method of claim 1, wherein the method further comprises the step:
using a power coupler to determine if the plug-in electric vehicle is connected to an external high-voltage power source that provides between 10 kW-300 kW of electrical power.

17. The method of claim 1, wherein the external power source is an external high-voltage power source that provides between 10 kW-300 kW of electrical power.

18. A charging system for charging a plug-in electric vehicle with an external high-voltage power source, comprising:
a power connection for connecting the plug-in electric vehicle to the external high-voltage power source;
isolation hardware coupled to the power connection, the isolation hardware isolates between 10 kW-300 kW of electrical power provided by the external high-voltage power source;
a battery coupled to the isolation hardware, the battery provides the plug-in electric vehicle with electrical power for vehicle propulsion;
one or more sensor(s) for providing data related to a charging session; and
a control module coupled to the sensor(s), wherein the control module is configured to use a costing function or a software model in conjunction with the charging data to estimate a negative impact that one or more charging sessions have had on the battery from charging with the external high-voltage power source, and to limit the between 10 kW-300 kW of electrical charging power that is provided by the high-voltage external power source to the plug-in electric vehicle when the negative impact on the battery exceeds some negative impact threshold.

19. A method for charging a plug-in electric vehicle with an external power source, comprising the steps of:
a) using a control module in conjunction with charging data related to a plurality of past charging sessions to estimate an overall negative impact that the plurality of past charging sessions have had on a battery of the plug-in electric vehicle, wherein the overall negative impact takes into account the individual impact of past charging sessions and the time between past charging sessions;
b) comparing the overall negative impact on the battery of the plug-in electric vehicle to a negative impact threshold; and
c) when the overall negative impact on the battery of the plug-in electric vehicle exceeds the negative impact threshold, then controllably varying the charging power that is provided by the external power source to the plug-in electric vehicle based on the overall negative impact on the battery of the plug-in electric vehicle.

* * * * *